United States Patent [19]
Tucker

[11] 3,888,780
[45] June 10, 1975

[54] PROGRAMMABLE PROJECTION SYSTEM
[76] Inventor: Donald Spencer Tucker, 9216 S.W. Grane Ln., Portland, Oreg. 97225
[22] Filed: Nov. 23, 1973
[21] Appl. No.: 418,333

Related U.S. Application Data
[63] Continuation of Ser. No. 272,560, July 17, 1972, abandoned.

[52] U.S. Cl. .................. 352/92; 352/166; 352/169; 352/180
[51] Int. Cl. ........................................... G03b 21/48
[58] Field of Search ....... 352/21, 92, 166, 169, 180; 226/42

[56] References Cited
UNITED STATES PATENTS

| | | | |
|---|---|---|---|
| 3,609,019 | 9/1971 | Tuber | 352/169 X |
| 3,642,356 | 2/1972 | Carignono | 352/180 |
| 3,664,735 | 5/1972 | Metzger | 352/92 X |
| 3,741,636 | 6/1973 | Nakayama | 352/180 |

*Primary Examiner*—Samuel S. Matthews
*Assistant Examiner*—Russell E. Adams, Jr.
*Attorney, Agent, or Firm*—Adrian J. La Rue

[57] ABSTRACT

Programmable projection system includes a projector and control unit which operates the projector at a selectable film frame rate so that frames are viewable in accordance with predetermined time intervals and indicates the number of frames of film that has been projected either in the forward or reverse direction. The control unit can hold the film in a still position for viewing a single frame for as long as desired or stop the projector upon automatic sensing of code means on the film until signaled to continue at a continuous or selected film frame rate.

8 Claims, 1 Drawing Figure

PROGRAMMABLE PROJECTION SYSTEM

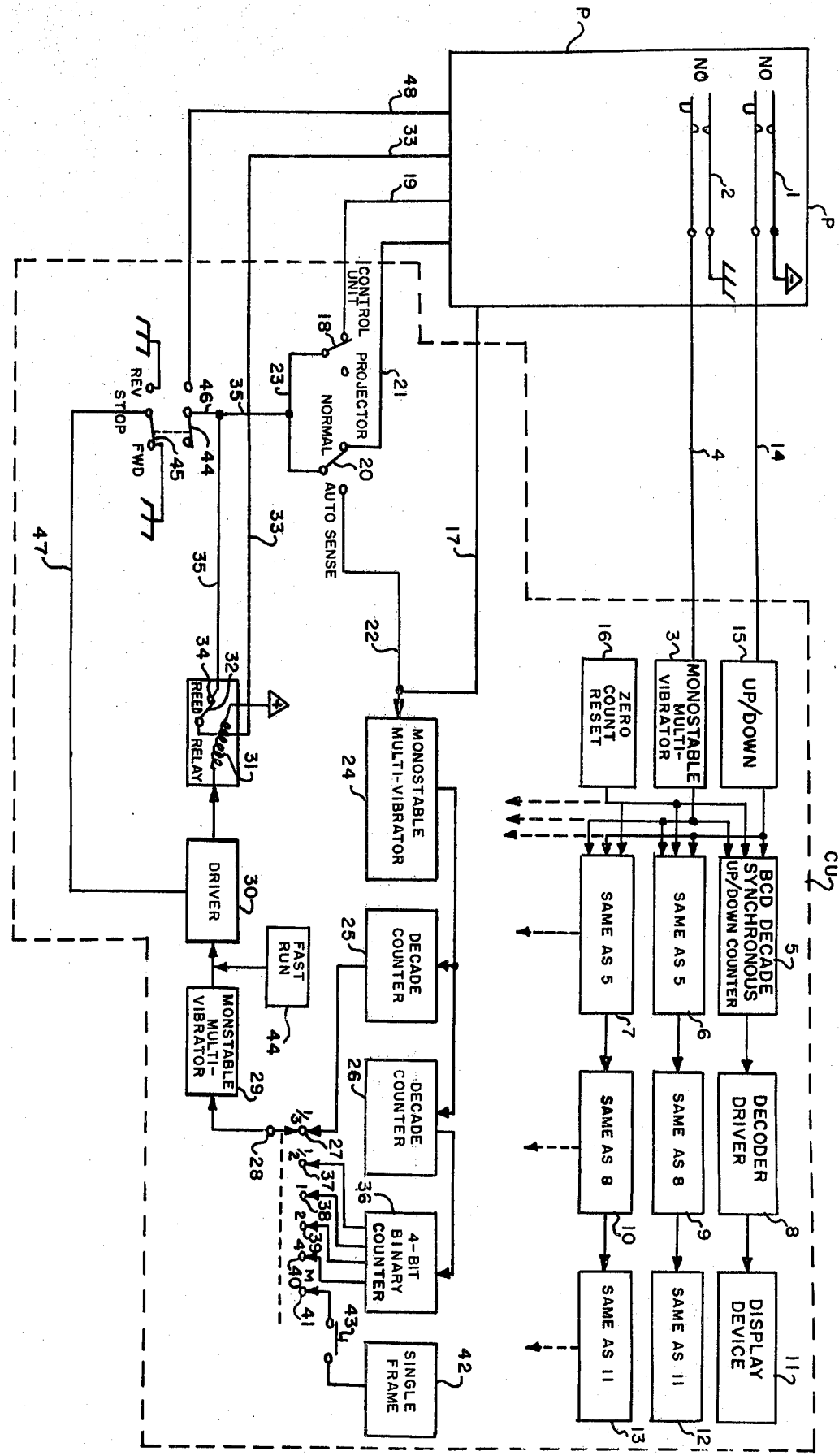

PROGRAMMABLE PROJECTION SYSTEM

This is a continuation of application Ser. No. 272,560 of Donald Spencer Tucker, filed July 17, 1972, now abandoned.

BACKGROUND OF THE INVENTION

This invention is directed to a projection system and more particularly to a projection system including a projector and control means for automatically controlling the operation of the projector in accordance with a selectable film frame rate and/or a precoded film and to count the number of film frames projected.

One type of existing projector system is provided with a continuous mode of operation whereby the film is operated at a constant frame rate which can be generally three speeds in either the forward or reverse direction or single frame operation whereby single frames are advanced at will and can be viewed for as long as desired. This projector system cannot provide selectable film frame rate and counting of the frames.

Another existing projector system utilizes electro-mechanical relays and an electro-mechanical counter to provide selectable film frame rate and counting of frames. This system is unreliable, cumbersome, allows only forward film frame counting, has limited time intervals at which frames can be viewed, does not permit remote operation, or permit programmed viewing of coded film. A further existing projector system provides a control means for automatically controlling selectable film frame rate, counting of frames, automatic stoppage of film when coded marks on the film are sensed and frame-by-frame operation, but this system does not provide programming capability whereby upon sensing of coded marks on the film, the control means automatically operates the projector in accordance with the selected time interval between frames.

An object of the present invention is to provide a programmable projection system that operates a projector at a selectable film frame rate so that frames are viewable at predetermined time intervals between frames.

Another object of the present invention is the provision of a programmable projection system having counting means for providing forward or reverse count of the film frames, and the counting means will operate at all speeds including when the control unit is bypassed.

A further object of the present invention is to provide a programmable projection system which is provided with automatic sensing means to sense code means on a film thereby stopping the projector and thereafter operating the projector in accordance with the selected time interval between frames whereafter the film is automatically operated continuously until another film code means is sensed.

An additional object of the present invention is the provision of a programmable projection system that enables the projector to be remotely controlled.

Other and further objects of the present invention will become apparent upon a reading of the detailed description of the invention when taken in conjunction with the drawing.

BRIEF DESCRIPTION OF THE DRAWING

In the accompanying drawing, the single FIGURE is a block diagram of a programmable projection system including a typical projector and programmable control means depicting a preferred embodiment of the invention.

DETAILED DESCRIPTION OF THE INVENTION

A typical projector P such as, for example, an 8mm projector is provided with normally open switches 1 and 2 which are added thereto. The stationary contact of switch 1 is connected to a negative voltage and the stationary contact of switch 2 is connected to ground. Switch 1 is in a closed position when the projector is moving film in a forward direction and is opened in reverse operation by the projector reverse-operating mechanism, which is a conventional mechanism and need not be shown.

Switch 2 is operated by the timing cam (not shown) of the projector-operating mechanism to supply input signals to a monostable multivibrator 3 in control unit CU via lead 4, each signal supplied to multivibrator 3 representing a frame of film. Multivibrator 3 shapes the frame signals supplied thereto to sharpen these signals and eliminate contact bounce. The output from multivibrator 3 is supplied as an input to conventional BCD decade synchronous up/down counters 5,6,7, corresponding to units, tens and hundreds. The outputs from counters 5,6 and 7 operate conventional decoder drivers 8, 9 and 10 which in turn operate display devices 11, 12 and 13. Display devices 11, 12 and 13 are preferable Nixie tubes, but then can be LED's or any other suitable readout device. As now illustrated, counters 5–7 and display devices 11–13 will count up to 999, but other counters, drivers and display devices may be added to provide a higher count if desired. Thus, when the projector P is operating and driving film in a forward direction, switch 1 is closed and switch 2 is supplying signals representative of the number of frames which the counters 5–7 count, and drivers 8–10 drive display devices 11–13 thereby indicating the total number of frames being projected. When projector P is operated to drive film in a reverse direction, switch 1 is opened and the negative voltage that was supplied along lead 14 to an up-down circuit 15 comprising an emitter grounded NPN transistor is removed which causes the counters to count down and the drivers and display devices to operate in a reverse direction.

A zero count reset circuit 16 is connected to counters 5–7 and it comprises a programmable unijunction transistor and associated parts, which, upon operation thereof by means of a push-button switch, supplies a pulse to reset counters 5–7 and display devices 11–13 to zero reading. The counter means will count frames in the forward and reverse direction irregardless of what other mode of operation the projector is undergoing or at whatever speed the projector is operating.

Lead 17 is connected to the timing mechanism (not shown) of projector P which runs at a constant speed and provides therealong an 18 hertz signal when projector P is normally operating. Switch 18 is moved to "control unit" position, which is connected to lead 19, and switch 20 can be placed in either the "normal" position, which is connected to lead 21, or the "auto sense" position, which is connected to lead 22. Switches 18 and 20 are connected together via lead 23.

The constantly recurring 18 hertz signal is supplied to monostable multivibrator 24, which is similar to monostable multivibrator 3, and it shapes the 18 hertz signal so that the pulses thereof can be processed more accurately. The output from multivibrator 24 is fed into decade counters 25 and 26. Decade counter 25 divides the 18 hertz signal by 6 so that the output therefrom supplies a 3 hertz signal to contact 27 of selector switch 28. This 3 hertz signal is supplied to monostable multivibrator 29, which, like multivibrators 3 and 23, shapes the 3 hertz signal prior to activating driver 30. The output from driver 30 activates coil 31 of a reed relay thereby moving contact 32 into a closed position with contact 34 at a 3 hertz rate. Contact 32 is connected to lead 33 and contact 34 is connected to lead 35 which is connected to lead 23.

Thus, with contacts 32 and 34 opening and closing at a 3 hertz rate, the frame-actuating mechanism will operate projector P via lead 19, switch 18, lead 23, lead 35, contacts 32 and 34 and lead 33 to cause projector P to feed the film at a rate of one-third second per frame rather than at the normal film-operating rate.

The constant 18 hertz signal is divided by nine in decade counter 26 to supply a 2 hertz signal into four-bit binary counter 36 which supplies outputs respectively at contacts 37, 38, 39 and 40 representative of ½, 1, 2 and 4 seconds per frame when selector switch 28 is positioned thereat in the same manner as hereinabove described with respect to switch 28 being positioned at contact 27.

If switch 28 is positioned at contact 41, a single frame cirucit 42 comprising an RC and diode network supplies a pulse when switch 43 is closed to monostable multivibrator 29 then driver 30 to operate coil 31 so that contacts 32 and 34 are closed each time switch 43 is closed thereby providing single frame operation at will of the operator.

Fast run circuit 44 comprises a normally open switch which grounds the driver circuit 30 and maintaining coil 31 energized so long as fast run circuit 44 is actuated which over-rides incoming signals thereby permitting projector P to operate at the constant speed at which projector is set; e.g., 18 frames per second.

When switch 18 is in "control unit" position, projector P operates in accordance with control signals applied thereto depending on the position of selector switch 28 relative to contacts 27, 37, 38, 39, 40 and 41. When switch 18 is in "projector" position, control unit CU will not provide any programmed speed control to the projector, the projector will operate at its normal speed determined by the timing cam and the counter members will count and display such count of frames.

When switch 20 is in the "normal" position, code marks on the film which would be sensed by the projector photocell sensing mechanism, (not shown) are bypassed so as not to interrupt the control unit operation.

When switch 20 is in "auto sense" position and switch 18 is in "control unit" position, control unit CU operates as if fast run circuit 44 were actuated whereby projector P operates at normal projector speed until a code mark on the film is sensed via a photocell at which time the projector will pause for the time period at which selector switch 28 is positioned, whereafter projector P resumes normal projector speed unless switch 28 is moved to the single frame position at contact 41 whereupon the projector will stop and remain still with the image on until fast run circuit 44 is activated whereby the projector will resume normal speed preselected at the projector until another code mark is sensed. In the "auto sense" position, projector P operates at selected projector speed until code marks are sensed, whereupon projector P will be operated at frame viewing rate at which switch 28 is positioned which permits an operator to provide a film with code marks at selected positions therealong in order to automatically stop the projector thereat and then operate the projector under the control of the position of selector switch 28.

Movable contacts 44 and 45 are connected to leads 46 and 47, respectively. Lead 46 is connected to lead 35 and lead 47 is connected to driver 30. When contacts 44 and 45 are moved to the "forward" position, driver 30 is supplied with ground potential via lead 47 so that the projector will advance film in a forward direction in accordance with the selected operation of the control unit. With contacts 44 and 45 moved to the "reverse" position, ground potential is also supplied via lead 47 to driver 30, and lead 48 energizes a solenoid (not shown) in the projector driving mechanism so that the projector is operated to drive the film in a reverse direction in accordance with the selected operation of the control unit. When contacts 44 and 45 are in the "stop" position, the projector will not operate because ground potential has been removed from driver 30. Thus, depending on the position of contacts 44 and 45, which are ganged to operate together, this will determine whether the projector will operate film in the forward or reverse directions or not permit the projector to move film at all.

Leads 4, 14, 17, 19, 21, 33 and 48 are preferably contained in a cable with the end to be connected to the projector being provided with a plug which electrically mates with a receptacle provided on the projector. Such an arrangement permits programmed remote control of the projector which permits the projector to be positioned at one location and the control unit to be positioned at an optimum location for operation by the operator. Of course, the control unit can be part of the projector. The projector and control unit can be packaged in such a manner to provide easy portability.

It is to be understood that certain features and subcombinations are of utility and may be employed without reference to other features and subcombinations and such is contemplated by and is within the scope of the appended claims.

It is also to be understood that all matter herein set forth or shown in the accompanying drawing is to be interpreted as illustrative and not in a limiting sense, because many embodiments may be made of the invention without departing from the scope thereof.

The invention is claimed in accordance with the following:

1. A system for projecting film having a series of frames; said system having a projection station, means for generating signals of a predetermined frequency,
   frequency dividing means responsive to the signals of said predetermined frequency for producing signals of lower frequency in its output,
   drive means for intermittently feeding successive film frames to said projection station at intervals corresponding to the frequency signals applied thereto and,
   means for selectively applying said signals of predetermined frequency or said signals of lower frequency to said drive means, whereby the film frames are fed to the projection station at intervals corresponding to the predetermined signal frequency or lower signal frequency.

2. A system for projecting film according to claim 1 wherein the means for applying comprises manually controlled switch means.

3. A system for projecting film according to claim 2 including a second manually controlled switch means for generating a pulse at each operation thereof, and means for terminating the application of said low frequency signals to the drive means and concurrently connecting the second switch means to the drive means to apply the pulse generated by said second switch means to said drive means for feeding a film frame to the projection station at each occurrence of said pulse.

4. A system for projecting film according to claim 1 wherein said film has a code mark on a selected film frame and the means for selectively applying the frequency signals to the drive means comprises sensing means responsive to said code mark for selecting said signals of lower frequency.

5. A system for projecting film in accordance with claim 4 including a manually controlled switch means for generating a pulse at each operation thereof, and means for terminating the application of said low frequency signals to the drive means and concurrently connecting the switch means to the drive means for applying the pulse generated to said switch means to said drive means for feeding a film frame to the projection station at each occurrence of said pulse.

6. A system for projecting film in accordance with claim 4 including means for rendering said terminating means inoperative.

7. A system for projecting film according to claim 1 wherein said dividing means is provided with a plurality of outputs of respective different frequencies, said means for selectively applying said signals to said drive means comprising means selectively connected to one of the outputs of said dividing means.

8. A system for projecting film in accordance with claim 1 including means for indicating the number of film frames that have been fed through said projection station.

* * * * *